US007007290B2

(12) United States Patent
Wilcoxson et al.

(10) Patent No.: US 7,007,290 B2
(45) Date of Patent: Feb. 28, 2006

(54) FLEXIBLE AIRFOIL RING FOR SAFELY FLYING CDS AND DVDS

(76) Inventors: Cynthia H. Wilcoxson, 1159 Vista Dr., Fortuna, CA (US) 95540; Don G. Harland, 1159 Vista Dr., Fortuna, CA (US) 95540

( * ) Notice: Subject to any disclaimer, the term of this patent is extended or adjusted under 35 U.S.C. 154(b) by 204 days.

(21) Appl. No.: 10/700,841

(22) Filed: Nov. 3, 2003

(65) Prior Publication Data

US 2004/0107431 A1 Jun. 3, 2004

Related U.S. Application Data

(63) Continuation-in-part of application No. 10/308,405, filed on Dec. 3, 2002, now abandoned.

(51) Int. Cl.
*G11B 23/03* (2006.01)
(52) U.S. Cl. ..................................................... 720/718
(58) Field of Classification Search ................ 720/718; 446/46–48; 206/216, 308.1; 273/317; 369/289
See application file for complete search history.

(56) References Cited

U.S. PATENT DOCUMENTS

| 3,900,986 A | | 8/1975 | Torres |
| 3,939,602 A | | 2/1976 | Burke et al. |
| 4,112,612 A | * | 9/1978 | Woods .......................... 446/48 |
| 4,176,843 A | * | 12/1979 | DeWitt, Jr. ................... 446/46 |
| 4,288,942 A | | 9/1981 | Nicholl |
| 4,334,385 A | * | 6/1982 | Melin et al. .................. 446/46 |
| 4,351,129 A | | 9/1982 | Kerkenbush et al. |
| 4,370,824 A | | 2/1983 | Resnicow |
| 4,940,441 A | * | 7/1990 | Novinsky ..................... 446/46 |
| 5,366,403 A | * | 11/1994 | Weiss ........................... 446/46 |
| 5,640,790 A | | 6/1997 | Johns |
| 5,774,448 A | | 6/1998 | Shtipelman et al. |
| 5,787,069 A | | 7/1998 | Lowe et al. |
| 6,247,989 B1 | * | 6/2001 | Neff ............................. 446/46 |
| 6,804,823 B1 | * | 10/2004 | Poole et al. ................. 720/725 |
| 6,883,663 B1 | * | 4/2005 | Laut ......................... 206/308.1 |

(Continued)

FOREIGN PATENT DOCUMENTS

DE    2001-203887    *    9/2000

(Continued)

*Primary Examiner*—Allen Cao
(74) *Attorney, Agent, or Firm*—Thomas M. Freiburger

(57) ABSTRACT

An annular protective ring attachment designed to grip the outer peripheral edge of all compact discs (CDs) and digital video discs (DVDs) which, when used in combination with said CD or DVD, creates an airfoil. The airfoil ring consists of an inner periphery, which is molded to form a top lip (3) and bottom lip (4), and between these lips, a gripping mouth (6), which securely holds the CD or DVD (7,76) inside the aperture of the airfoil ring. The body of the airfoil ring is curved in such a way as to create an airfoil adequate to enable the airfoil ring with inserted CD or DVD to be safely tossed into the air and to exhibit controllability in flight. The airfoil ring is constructed of a soft, flexible plastic material, and uses a hinge groove (5) on the top side of the airfoil skirt (1) and a hinge groove reaction area (9) on the underside of the airfoil skirt (1) to dissipate the contact force upon impact and create a cushioning effect so as to avoid resultant injury or damage when tossed into the air. A locking groove (8) inside the gripping mouth area (6) traps the sharp edge of the CD or DVD (7), preventing it from dislodging upon impact and causing injury.

4 Claims, 8 Drawing Sheets

U.S. PATENT DOCUMENTS

| | | | |
|---|---|---|---|
| 6,899,587 B1 * | 5/2005 | McClung et al. | 446/46 |
| 2002/0017759 A1 * | 2/2002 | McClung et al. | 273/317 |
| 2002/0163878 A1 * | 11/2002 | Hulme et al. | 369/289 |
| 2003/0022586 A1 * | 1/2003 | Beged-Dov | 446/46 |
| 2004/0066733 A1 | 4/2004 | Poole et al. | |
| 2004/0178090 A1 * | 9/2004 | Laut | 206/308.1 |

FOREIGN PATENT DOCUMENTS

| | | | |
|---|---|---|---|
| DE | 010036497 A1 * | 2/2002 | |
| GB | 2303311 A * | 2/1997 | |

* cited by examiner

FLEXIBLE AIRFOIL RING FOR SAFELY FLYING CDS AND DVDS

This application is a continuation-in-part of application Ser. No. 10/308,405, Filed Dec. 3, 2002, now abandoned.

BACKGROUND OF THE INVENTION

This invention relates to the use of compact discs (CDs) and digital video discs (DVDs, sometimes referred to as digital versatile discs) in the fields of advertising, mass distribution, and toys, specifically in making their use safer for consumers and more profitable for advertisers.

A number of patents refer to the use of a foam or other plastic ring designed to fit around the perimeter of a flying disc, most with the purpose of giving the disc aerodynamic characteristics.

U.S. Pat. No. 5,366,403 refers to a foam ring designed to fit around a disposable paper or plastic dinner plate. The shape of the plate itself creates the airfoil, and varies, aerodynamically, based on the shape of the particular plate used and the manner by which it is inserted. The foam ring serves as a protective surface. It is not an integral component of the airfoil.

U.S. Pat. No. 4,351,129 refers to a flying disc wherein a circular, clear insert is permanently attached across the center aperture of the annular disc, using a series of corresponding holes and pegs attached in a fusing process. This disc is constructed using a rigid plastic.

U.S. Pat. No. 4,940,441 refers to an aerodynamic disc wherein a weighted insert is attached to the inside perimeter of a plastic ring via threading on both pieces.

U.S. Pat. No. 4,176,843 refers to a two-piece disc, bonded together, with a solid, flat center.

U.S. Pat. No. 3,900,986 refers to an aerodynamic unit with air-activated whistle elements positioned around the periphery.

The above are patents that refer to a foam, PVC, or other plastic ring encircling a disc such as a paper plate, or flat plastic circle. However, none of the references shows a ring shaped to fit annularly on the edge of a CD or DVD. In addition, none is shaped to create an airfoil in conjunction with the flat surface of a CD or DVD. U.S. Pat. No. 5,366,403 shows possible aerodynamic characteristics, but the airfoil is created by the paper plate and not dependent on the ring itself. Moreover, none shows the use of an integral hinge system to lessen contact force upon impact, and none shows the use of a locking groove within a gripping mouth to prevent slippage of the CD or DVD upon impact. In addition, none of the above-mentioned references shows the use of a combination of different plastics as part of the annular rim, a soft porous plastic for safety and a more rigid plastic for stability.

Compact discs (CDs) are commonly used for mass distribution advertising, marketing products, product catalogs, software distribution, recorded music, data storage, hard drive storage, and digital graphic cataloging and storage. They also have a growing and unlimited number of other uses. Digital video discs (DVDs) are becoming the preferred medium for distribution of movies, both for sale to consumers and rentals. Mini-CDs, a smaller version of the CD, are used in the music industry for single recordings, as business cards, and in a growing number of other uses. Because CDs and DVDs are inexpensive and easy to distribute, hundreds of millions have been produced and distributed, and the number is steadily increasing. CDs and DVDs have also become the preferred method for data storage for businesses and other institutions of all sizes.

The development of CD-DVD Read/Write drives, commonly known as CD burners, has enabled consumers to use CDs and DVDs to store computer files, copy their own music recordings, copy movies, and for, potentially, a myriad of other uses. Millions of blank CDs are already being manufactured and sold for storage and duplication.

Many companies such as Internet Service Providers (ISPs) send millions of CDs to consumers through the mail. The CDs contain all the tools and software necessary to subscribe to that particular ISP. Other companies, such as software mail order companies, send their catalogs out to consumers in the form of CDs. These mass mailings have become increasingly more common, to the point that consumers often consider them to be in the same category as junk mail and rapidly discard them. This is highly undesirable for three reasons:

a) Unusable, discarded or obsolete CD or DVD discs are at present a non-degradable waste product.

b) Marketing and advertising dollars are essentially wasted. CDs are in the hands of consumers and in use only a small amount of time, if at all, and are then discarded or tossed onto a shelf and forgotten.

c) Children and adults pick up discarded CDs and use them as toys because of their "flying saucer" shape. They are thrown through the air, often in destructive and injurious ways. The problem of injuries is due to the hard, sharp edges on the perimeter of the CD or DVD. That sharp edge is the first contact surface to hit a person or an object, and quite often hits with substantial impact.

Some people, who are actively aware of the need for recycling, reuse CDs by recording over the original material. This is not possible in many instances, and moreover, new blank CDs have become so inexpensive that most people simply use new ones rather than go to the trouble of re-recording.

Large sporting events and concerts are seen by advertisers as having great potential for mass distribution of advertising CDs. They are reluctant, though, because large, sometimes boisterous crowds may begin throwing the CDs around like flying saucers because they fly fairly well. The edges of CDs are hard and sharp, which could cause serious injuries.

The same is true at the home level. The round, flat shape of CDs gives them a degree of lift, creates a rudimentary airfoil, and makes them conducive to flight. Because of that capability, it is natural to pick them up and throw them through the air. They are commonly tossed and flown by both children and adults. They fly easily, and can be tossed fairly accurately at targets. But the issues of serious injury and of damage to furniture, walls, and anything else in their paths, still remain a substantial problem for the following reasons:

a) CD and DVD discs, in their present form, must travel through the air at high speeds in order to stay aloft.

b) By design, there is nothing to keep the CD or DVD disc traveling horizontally through the air. They twist and turn and slam hard into whatever they hit, creating high contact forces due to a very small and sharp contact area on the outer edge of the disc.

SUMMARY OF THE INVENTION

The invention is a circular soft plastic ring designed to grip a CD or DVD securely within its aperture, and, in combination with that CD or DVD, to create an airfoil. The airfoil ring, with its integral hinge and locking groove, permits a CD or DVD to fly, hover and float, when tossed into the air, without danger of injury or property damage from the hard, sharp peripheral edge of the CD or DVD.

We have used two existing and unrelated common ideas, the airfoil ring and a gripping lip, and combined them for use with the CD or DVD, to create a completely new product. We have incorporated both a hinge system and a locking system into the airfoil ring unit for safety. Accordingly, several objects and advantages of our invention are:

(a) to provide a device that, when attached to a CD or DVD, creates an airfoil adequate to give the CD or DVD lift, hoverability and controllability when tossed.

(b) to provide a means for tossing and flying CDs and DVDs in a safe way, inside or outside, significantly decreasing the potential for bodily injury or property damage.

(c) to provide a new use for the millions of CDs and DVDs that are delivered by mail, which are considered "junk mail" and would otherwise be discarded.

(d) to provide a way to recycle the millions of CDs and DVDs, which are non-biodegradable and not easily recyclable, and which are used and discarded, stored and forgotten, or discarded because they are considered useless.

(e) to provide advertisers with a new medium for distributing catalogs, advertising, and any other material or software they wish to have widely circulated—a CD with the soft ring attached can be tossed into the crowd at sporting events, music events, or any other place where large numbers of people gather, without the current problem of potential injuries.

(f) to provide advertisers a means of circulating their advertising or software in a way that it will not end up in the trash, but will continue to be circulated from one consumer to the next. This is advantageous because:

a. the soft ring around the CD can be manufactured in any color. It can have any company or advertiser's trademark, logo, brand, colors, website, phone numbers, or any other desired or pertinent information incorporated directly into the mold at the time of manufacture. It can also be added after manufacture.

b. products of this nature, especially toys with trademarks, often become collectible, and as such, are traded, sold, and often displayed.

c. when tossed into a crowd, the advertising CDs will continue to be circulated by consumers tossing them back and forth, putting them into an ever-increasing number of consumers' hands.

d. when tossed into a crowd, the advertising CDs are not likely to be discarded. Attractive, fun giveaways are much more likely to remain in the hands of the consumer, who will take them home and:
     i. by easily removing the CD or DVD from the airfoil ring, the user can insert the CD or DVD into a computer or DVD player and retrieve and use information on the disc as it was intended to be used.
     ii. use the advertising CD or DVD with attached soft airfoil ring as a toy.
     iii. by continuing to toss the CD or DVD with attached soft airfoil ring, will keep it in circulation among other consumers.
     iv. be kept as a souvenir of the event.
     v. be collected or traded.

e. when advertising CDs are used with the attached protective airfoil ring in a way that consumers are less likely to discard them and more likely to keep them circulating, brand name recognition is continually reinforced and advertising dollars are maximized.

(g) to provide a way to turn an item with limited, but essential function (CD, DVD, mini CD or mini DVD), which is currently only used for data storage and recording, and is then stored or discarded, into a new, safe toy for children and adults, suitable for play in almost any environment, inside or outside, with unlimited new uses such as:

a. tossing the CD or DVD with attached protective airfoil ring back and forth between two or more people.

b. tossing the CD or DVD with attached protective airfoil ring at a target or into a target receptacle.

c. tossing the CD or DVD with attached protective airfoil ring in various ways that cause it to perform stunts and tricks.

d. modifying the protective airfoil ring in such a way as to cause the CD or DVD with attached soft airfoil ring to fly in different patterns, make sounds as it flies, or perform stunts and tricks.

(h) to provide a unique means for distributing mini-CDs and business card CDs, which are smaller versions of a CD, and can fit into a smaller scale version of the original airfoil ring.

Further objects and advantages will become apparent from a consideration of the drawings and ensuing description.

DRAWING FIGURES

FIGS. 7, 8, 9, 10, 11, 12, and 13 show cross-section end piece views of alternative embodiments of the protective airfoil ring, each with a different, one-piece shape modified for a particular purpose or characteristic.

FIGS. 14, 15, 16, 17, 18, and 19 show cross-section end piece views of alternative embodiments of the protective airfoil ring, each having a two-piece shape modified for a particular purpose or characteristic.

DESCRIPTION OF PREFERRED EMBODIMENTS

FIGS. 1A to 6

The following descriptions pertain to the preferred embodiment. Variances are likely, though, when alternative materials are used manufacturing the protective airfoil ring.

Figure 1A:
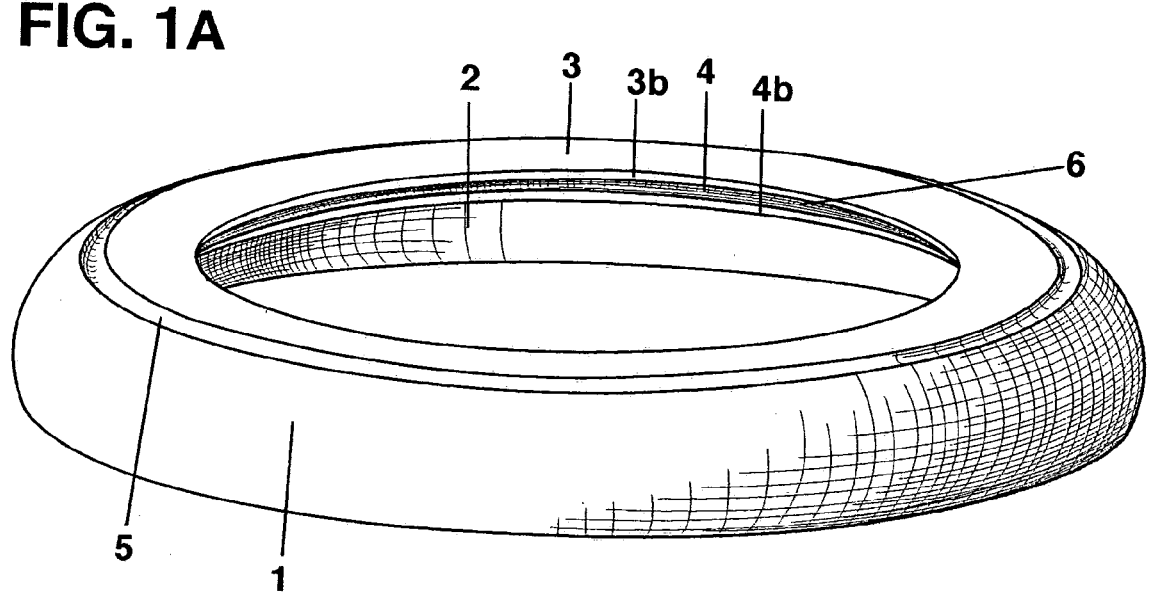
FIG. 1A shows a perspective view of the top of the airfoil ring and the top view of the inner lips and gripping mouth.
Figure 1B:
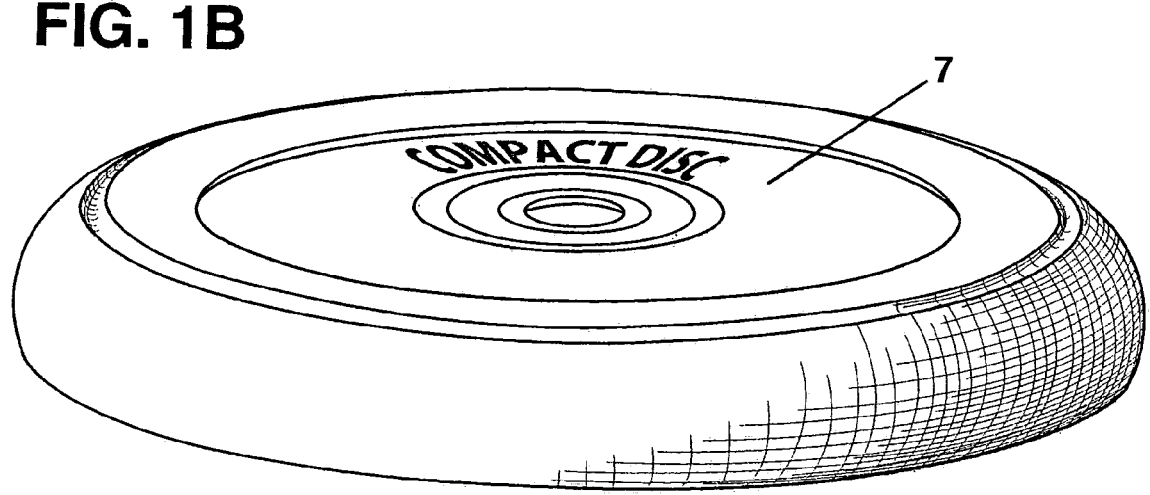
FIG. 1B shows the same perspective view as in FIG. 1A, but with the CD or DVD inserted into the gripping mouth between the lips.
Figure 2A:
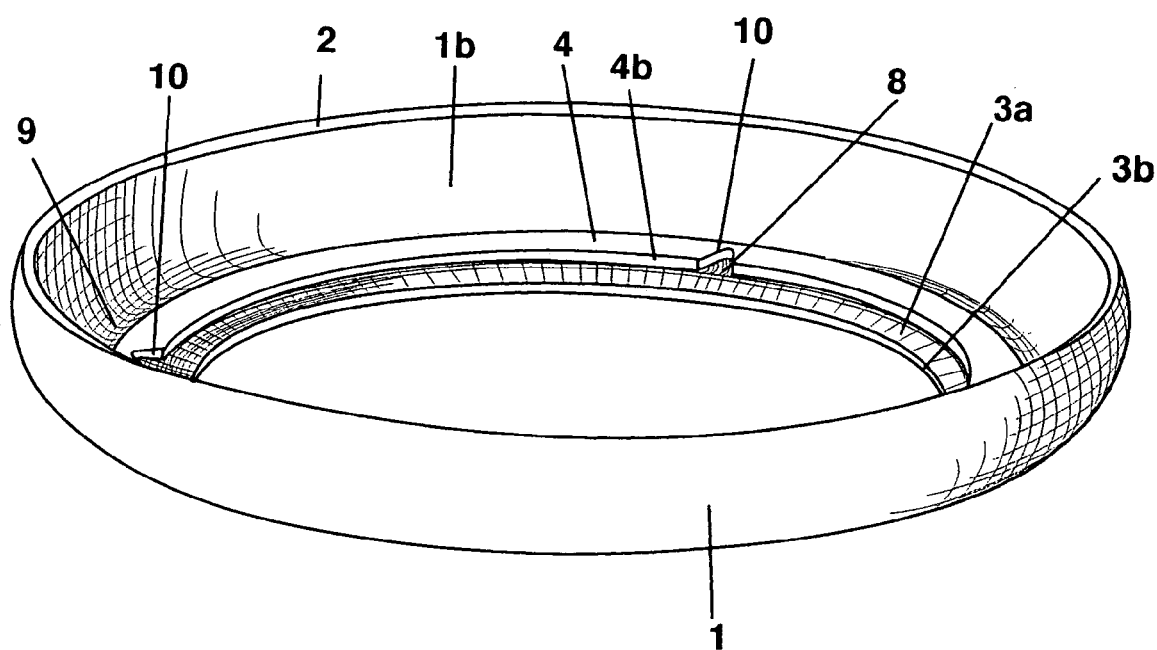
FIG. 2A shows a perspective view of the under side of the airfoil ring and the underside view of the lips and gripping mouth.
Figure 2B:
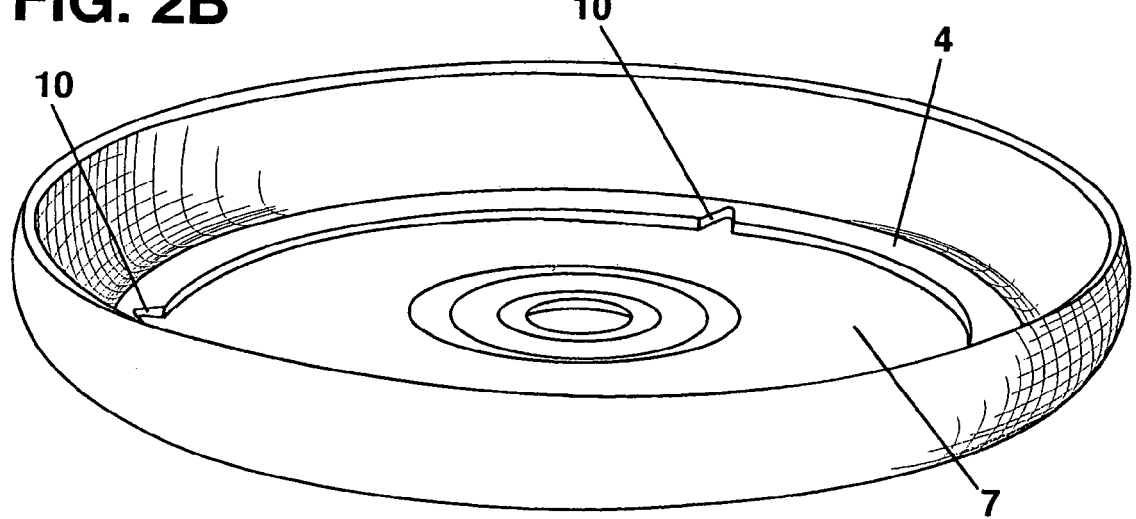
FIG. 2B shows the same perspective view as in FIG. 2A, but with the CD or DVD inserted into the gripping mouth between the lips.

A preferred embodiment of the protective airfoil ring, the present invention, is illustrated in FIG. 1A, FIG. 2A, and FIG. 3A. FIGS. 1B, 2B and 3B show this embodiment with a CD or DVD 7 inserted into its gripping mouth 6 as it would be when in use. The term CD or DVD is to be understood herein and in the claims to include mini CDs and DVDs and credit card CDs and DVDs.

The preferred embodiment, FIGS. 1A and 2A is a single-piece unit made of any of a variety of plastic materials with variable properties, the preferred plastic being Dynaflex, a flexible, but not malleable, slightly elastic, thermal plastic elastomer compound, manufactured by Hi-Tech Rubber of Pasadena, Calif. (generic name: styrene-ethylene-butylene-styrene block copolymer). The durometer range is between 35 and 80, a durometer of 60 being preferred. Higher durometers increase hardness, lower durometers increase softness. Durometer, as it affects hardness, affects the ease of insertion of the CD or DVD. Softer plastics decrease contact forces upon impact. With a durometer of 60, the average weight of the preferred embodiment, FIGS. 1A and 1B, is 40–44 grams. The weight of the preferred embodiment, FIGS. 1A and 2A, can vary between 20 grams and 100 grams, the variance dependent upon desired flight characteristics and materials used. The weight can vary significantly when alternative materials are used to manufacture the airfoil ring, or when alternative embodiments are used or modifications to any embodiments are utilized. The material used for the protective airfoil ring is available in a variety of colors and durometers and can easily be used as is, or modified for use in injection mold, pour mold, or other molding or sculpting processes. It lends itself to molding or sculpting with engraved, recessed or raised lettering, designs or any written information. The finished product can then have a raised message, name, design logo or any advertising desired. A number of other materials can be used, including polyethylene, various polymer products, various plastics and poly plastics, foam products, rubber products, silicone products, vinyl, nylon, various impregnated or laminated fibrous materials, various plasticized materials, cardboard, paper, leather, or other organic material, or nearly any material that can be molded, sculpted, shaped or cut to shape.

When placed in a natural, horizontal position on a flat, horizontal surface, the protective airfoil ring is perfectly circular, both on its upper, or top surface and its lower or bottom surface. The descriptions and measurements in this descriptive section are based on that stationary position. Variances in that shape will occur in flight as flight speed and impact force can cause temporary distortion in the soft, slightly elastic material used for the preferred embodiment.

In much of the following descriptive text, directional words are used for clarity. The word "inner" or "inward" will mean toward the center of the circle formed by the airfoil ring. "Outer" or "outward" will mean toward the outer periphery of said circle. "Top" and "bottom" or other such words are used to refer to the device in a normal position (as in FIG. 1B), to describe positions of various features, but are not intended to be limiting as to orientation of the device.

As illustrated in the perspective top view in FIG. 1A of a protective airfoil ring A of the invention, the outer periphery of the center aperture is formed by the inner peripheral edge 3b of a top lip 3. The diameter of said aperture is about 104 mm, but can vary by up to about 8 mm, less or more, and still allow the airfoil ring to grip the CD or DVD 7, FIG. 4B. If the diameter of this aperture is greater than about 112 mm in diameter, the CD or DVD will not be gripped securely, and will likely dislodge with force upon impact, making the airfoil ring with inserted CD or DVD unsafe when tossed. The diameter of the outer periphery, at the widest point of an airfoil skirt 1, is about 153 mm. This dimension can vary widely depending on desired flight characteristics, discussed in the alternative embodiments section, and materials used. The height of the preferred embodiment, if stationary on a horizontal plane, is approximately 20 mm, vertical distance, from the bottom edge 2 of the airfoil skirt 1 to the highest point of the top lip 3. The airfoil skirt 1, from a hinge groove 5 to the bottom edge 2 of the airfoil skirt 1, is typically about 2 mm to 2.5 mm thick. This measurement may vary depending on the type of molding or sculpting process used, material used and any alterations or modifications used for desired flight characteristics. This section of the airfoil skirt 1 curves convexly from the hinge groove 5 to the bottom edge 2 of the airfoil skirt 1. The vertical distance between these two points is about 17.5 mm. The actual distance along the convex curve between the same two points is about 22 mm.

The top part of the airfoil ring, FIG. 1A, is formed by the top lip 3, which extends from the hinge groove 5 inwardly to periphery of the aperture, or center opening at the edge of the top lip 3b. This is also clearly illustrated in FIG. 4A and FIG. 5B. The inner edge of the top lip 3b is curved or beveled. The distance between the inner edge of the hinge groove 5, FIG. 5B, and the inner edge of the top lip 3b is about 12.5 mm, but is variable. The top surface of the top lip 3 is slightly curved in a convex manner. The thickness at the inner edge of the top lip 3b is approximately 1 mm. The thickness of the top lip 3 directly adjacent and to an inward side of a locking groove 8 is normally about 2.7 mm. Directly above the locking groove 8, FIG. 5B, the thickness of the top lip 3 is approximately 1.5 mm.

To the outward side of the locking groove 8, the top lip 3 meets a bottom lip 4. In an area between the locking groove 8 and the hinge groove 5 is a crotch 11. This is best illustrated in the detail view of FIG. 5B. At its thickest point, the crotch 11 measures approximately 5.5 mm vertically. The bottom lip 4, also best illustrated in FIG. 4A and FIG. 5B, extends inwardly toward the aperture and generally parallel to the top lip 3, about 3.5–4.5 mm from the back (deep) edge of the locking groove 8, or inner side of the crotch 11, to the to the inner edge of the bottom lip 4b. The inner edge of the bottom lip 4b is curved or beveled.

Figure 4A:
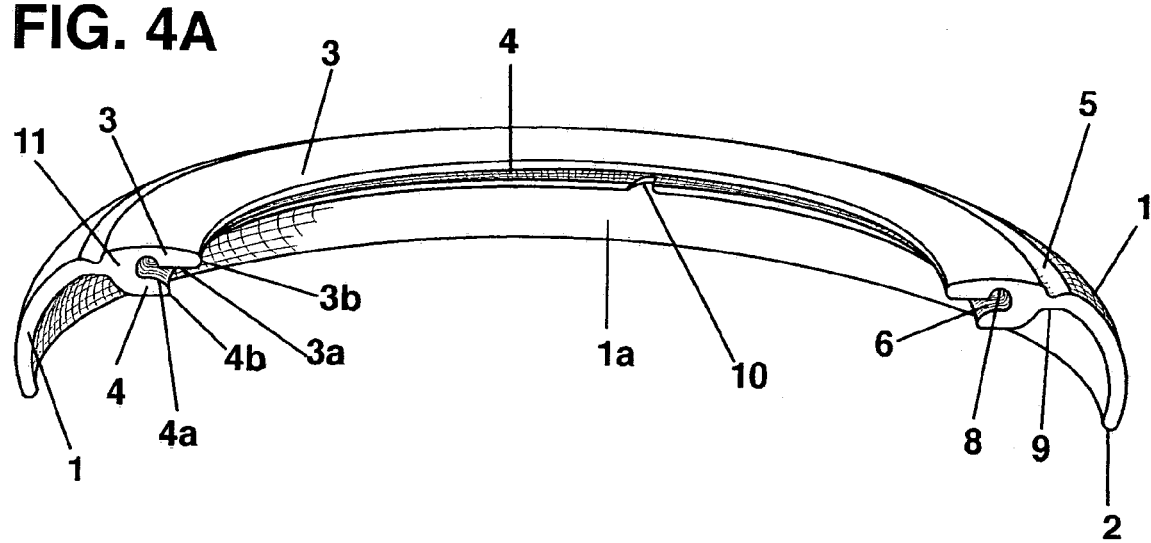
FIG. 4A shows a perspective view of a cross-section of the airfoil ring, and specifically, the end section with detail of the lips and gripping mouth.
Figure 4B:
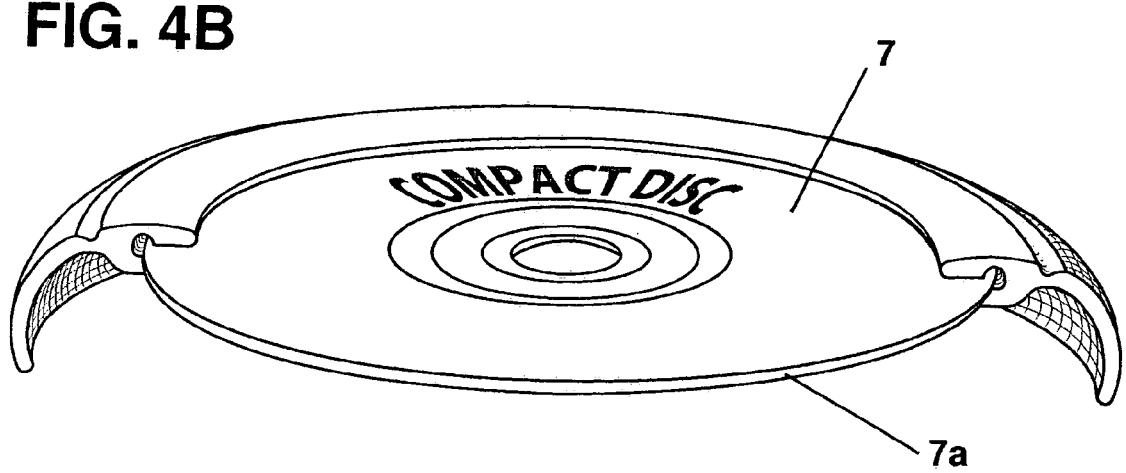
FIG. 4B show the same perspective view as in FIG. 4A, but with the CD inserted into the gripping mouth between the lips.
Figure 5A:
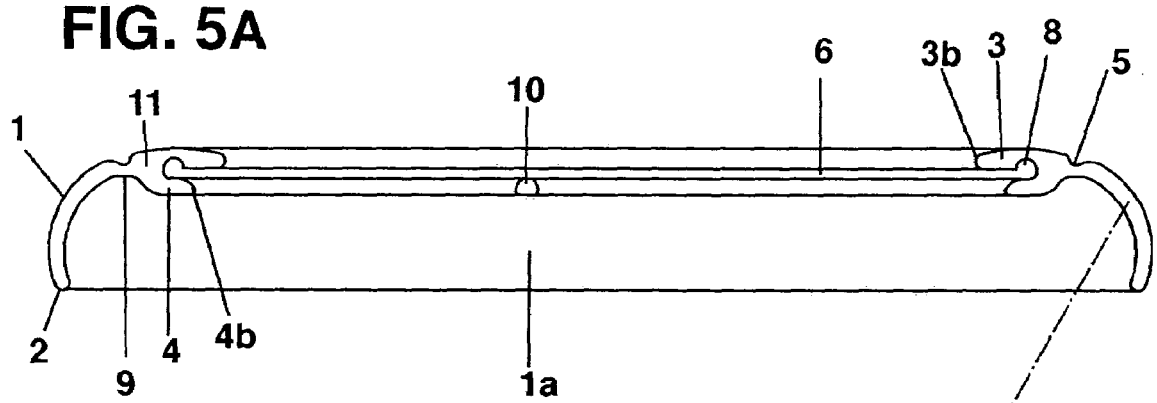
FIG. 5A shows a drawing of the cross-section of the airfoil ring.
Figure 5B:
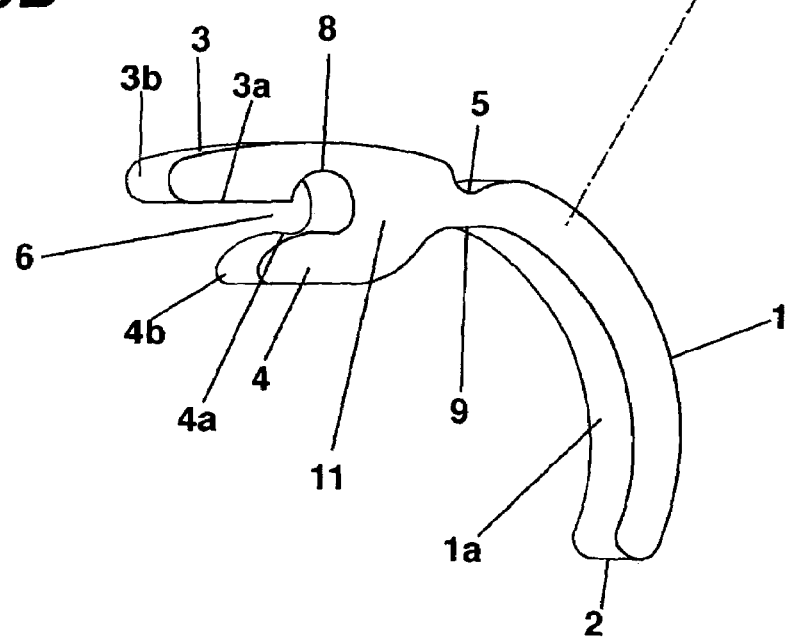
FIG. 5B shows an exploded view of the end piece of the cross-section of the airfoil ring in detail.

As shown in FIG. 4A and FIG. 5B, the top lip 3 and the bottom lip 4 extend inwardly from the from the crotch 11 perpendicular to the back edge of the locking groove 8 and parallel to each other. This forms a gripping mouth 6, as an annular internally-facing groove. The gripping mouth 6 is the opening between the top lip 3 and the bottom lip 4 where the CD or DVD 7, FIG. 4B is inserted and held, or gripped. The mouth 6 is approximately 1.3 mm wide at its narrowest point adjacent to the inward side of the locking groove 8, adequate to receive and grip the edge of a CD or DVD 7. Because the material being used for the preferred embodiment, Dynaflex, is soft and flexible, this opening, the gripping mouth or groove 6, can vary slightly in width, depending upon how the airfoil ring is being used, being held, and whether or not a CD or DVD 7 is in place.

FIG. 4A and FIG. 5B show the area at the back of the gripping mouth 6, between the back of the interior surface of the top lip 3*a* and the crotch 11, where there is a cutout area functioning as the locking groove 8. The locking groove 8 is approximately semi-circular or somewhat more than semi-circular, with a diameter of approximately 2.75 mm, or between about 2.5 mm and 3 mm.

In FIG. 1A the hinge groove 5 is clearly illustrated. The hinge groove 5 is a generally triangular groove that encircles the entire top portion of the airfoil ring at the point where the crotch 11 meets the airfoil skirt 1. The depth of this locking groove 8 is approximately 1.25 mm to 1.5 mm at its deepest point, where it is rounded. It is approximately 2.75 mm wide (or about 2–3 mm wide) at its widest point on the top surface of the airfoil ring with rounded edges. The shape of the hinge groove 8 is best illustrated in FIG. 5B. Also visible in FIG. 5B, as well as 2A, is the hinge reaction area 9, which is directly opposite the hinge groove 5, on the underside of the airfoil ring where the inner side of the airfoil skirt 1*a* meets the underside of the crotch 11. The preferred thickness between the hinge groove 5 and the hinge reaction area 9 is about 0.75 mm to 0.95 mm. The horizontal measurement of this area is approximately 3.5 mm. The airfoil skirt 1 extends downward in a convex curve, FIG. 1A, or a concave curve if viewed from the underside as in FIG. 2A. The airfoil skirt, from the outer edge of the hinge groove 5 to the bottom edge of the airfoil skirt 2 measures around the approximate arc, is approximately 22 mm along the outside convex curve. The vertical distance between these two points is about 17.5 mm. The bottom edge of the airfoil skirt 2 is rounded.

Figure 3:
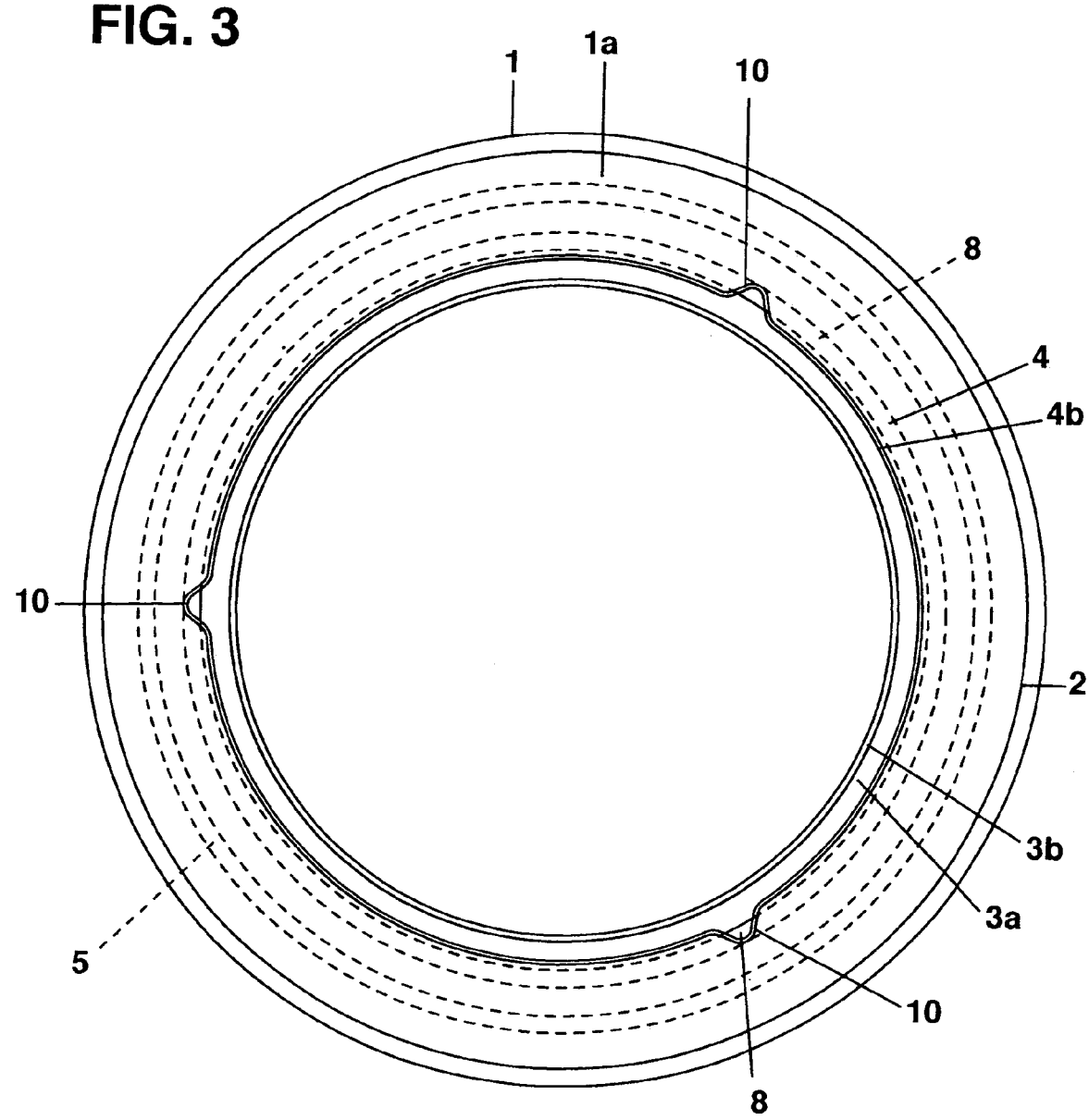
FIG. 3 shows a drawing showing the underside view of the protective airfoil ring.

A series of optional insertion notches 10 along the bottom lip 4 is illustrated in the rendering in FIG. 2A and their placement is shown in FIG. 3. Three insertion notches 10 are cut out of the bottom lip 4. They are preferably evenly spaced around the inside periphery of the bottom lip 4. The insertion notches 10 preferably are roughly triangular in shape with rounded corners and edges, and can number one or more. In the preferred embodiment, they are placed so that the base side of the triangle is about 6.35 mm and is contiguous to the inner edge 4*b* of the bottom lip 4. This width can vary between about 1.5 mm and 15 mm and still function adequately. The rounded vertex of the triangular insertion notch 10 is approximately 3.5 mm from the base side, measured perpendicularly from the base side outwardly to the vertex. All corners of the insertion notch 10 are rounded.

Figure 6:
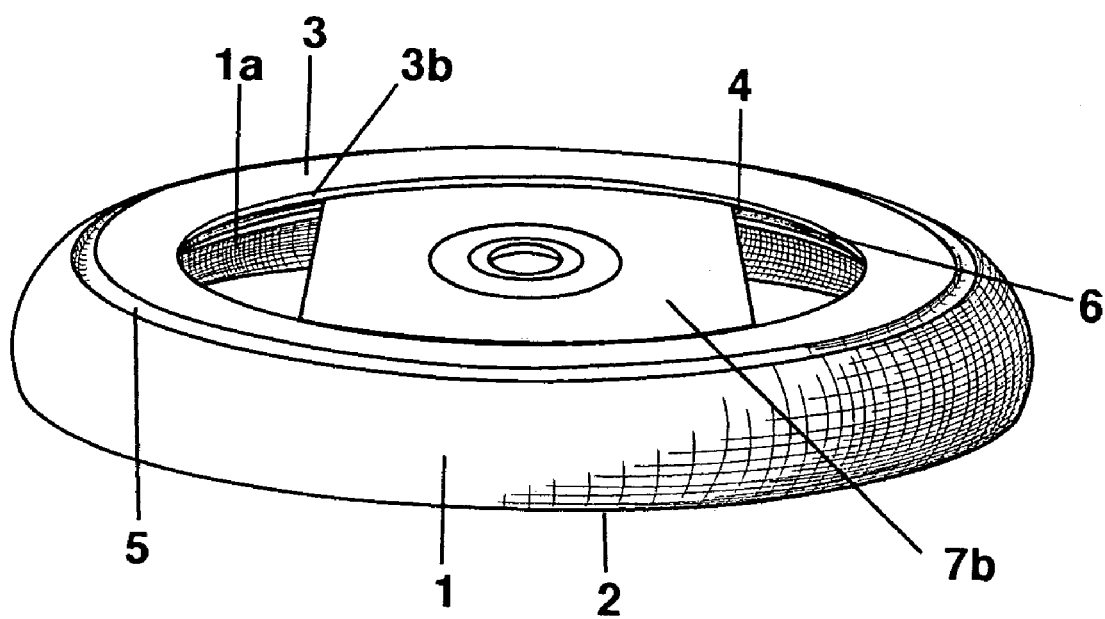
FIG. 6 shows a perspective view of a smaller version of the protective airfoil ring. It has been reduced to a size suitable for the mini-CD or business card CD, which is shown.

The preferred embodiment, or any of the alternative embodiments, can be easily manufactured in a smaller scale to accommodate mini-CDs or business card CDs of various sizes. Standard CDs generally measure approximately 120.5 mm or 4.75 inches in diameter. Mini-CDs, a smaller version of the CD, are being manufactured with diameters ranging from 50 mm to 90 mm, or 2 inches to 3.5 inches, and often have cutout sections which can cause their shape to vary from circular to nearly rectangular with curved edges, 7*b*, FIG. 6. Any embodiment of the airfoil ring can be manufactured with an inner aperture diameter as small as 25 mm, and as large as need be to accommodate variant sizes of Cds,DVDs or mini CDs or DVDs. A sample of an airfoil ring scaled to fit a business card mini-CD 7*b* is illustrated in FIG. 6. This scaled-down version can fit both the mini CD and the business card CD.

Operation

The CD or DVD 7 is inserted with the fingers between the top lip 3 and bottom lip 4 into the gripping mouth 6 of the protective airfoil ring as illustrated in FIG. 4B. The flexible plastic material used for the airfoil ring is flexible enough to make insertion easy. Insertion is also aided by the rounded or beveled top lip edge 3*b* and bottom lip edge 4*b*. There are no square edges for a CD or DVD to get hung up on while inserting. The insertion notches 10, FIG. 3, are optional, but aid significantly with speed and ease of insertion. A CD or DVD can be inserted without them. When large numbers of CDs or DVDs need to be inserted into the airfoil rings, speed of insertion becomes important for both labor costs and time involvement.

The airfoil ring with inserted CD or DVD 7, FIG. 1B, is tossed horizontally through the air with a flick of the wrist, much as a person would toss a traditional "flying saucer" or, more commonly in recent years, a Frisbee. The unit will fly through the air in a manner dependent upon the angle and force with which it was tossed. It spins as it flies. Because of its shape and spinning motion, the protective airfoil ring and inserted CD or DVD 7 will tend to sail and float as it spins through the air. Good airfoil lift can mean the airfoil ring with inserted CD or DVD has more controllability, flies longer and achieves better distance at a slower speed. The slower it flies, the more gently it hovers and floats. When it floats gently, it is easier to catch. Good airfoil lift also will allow the airfoil ring to catch and float with air currents.

Safety is an important factor in the manufacture and use of the protective airfoil ring. A CD or DVD has very sharp edges. In order to fly, the protective airfoil ring with an inserted CD or DVD, FIG. 1B, must travel at a fairly high rate of speed. When the airfoil ring, with inserted CD or DVD, hits a person or object at a high rate of speed, the impact causes a reaction. Without the locking groove 8, a hard impact can cause the outer airfoil skirt 1 to bend inward to the point that it lifts the top lip to a point nearly perpendicular to its normal position. The CD or DVD 7 can then pop out. Because of its velocity, the airfoil rim with exposed sharp CD or DVD edges 7*a*, FIG. 4B, could cause injury. With the locking groove 8, FIG. 4A or 5B, in the same impact scenario, the top lip 3 may bend upward, but the sharp edge of the CD or DVD 7*a* is caught by the edge of the locking groove 8, and does not pop out of the gripping mouth 6. Impact force, then, is not likely to cause injury.

Another safety element designed into the protective airfoil ring is the hinge groove 5, best illustrated in FIG. 4A and FIG. 5B. The hinge groove 5 allows the airfoil skirt 1 to collapse at the hinge upon impact so that pulling and stretching forces on the top lip 3 are reduced. With these forces reduced, the top lip 3 will not distort and the edge of the CD or DVD 7*a* will be held securely in place. The hinge groove 5, with its collapsing action, also lessens the force of the impact by distributing the points of impact across a larger area of the airfoil ring. As the hinge groove 5 allows the airfoil skirt 1 to collapse, there is a corresponding reaction on the underside of the airfoil ring. Upon impact, the airfoil skirt 1 folds inward toward the crotch 11. The area on the underside of the airfoil ring directly opposite the hinge groove 5 is the hinge reaction area 9, FIG. 2A and FIG. 5B. It has been designed to absorb shock on impact, and at the same time, to release tension at the gripping mouth 6, top lip 3, bottom lip 4, and the locking groove 8 areas. These factors significantly increase the safety of the protective airfoil ring.

Insertion of the CD or DVD 7 into the gripping mouth 6 can be made easier by using optional insertion notches 10, FIGS. 2A, 2B and 3, described above.

FIGS. 7 to 19

There are numerous and varied possibilities with regard to the relative shape and size of the protective airfoil ring and for each of its integral parts. All illustrated embodiments described in this section utilize the same basic shape as the preferred embodiment, that being an annular flexible plastic ring designed to grip a CD or DVD securely within its center aperture and, in combination with that CD or DVD, create an airfoil. There are innumerable possibilities, however, with regard to modification of the preferred embodiment.

The alternative embodiments in FIGS. 7–19 are illustrated using the end part of a cross-section of the entire embodiment, such as in FIG. 5B, a more clear and detailed means to show the discussed areas of the embodiment. Alternative embodiments illustrated and discussed are embodiments that have been designed for special purposes or processes. All can be used in combination with a standard or mini CD or DVD to create an airfoil capable of flight; however, some embodiments do not meet desired safety standards.

Figure 7:
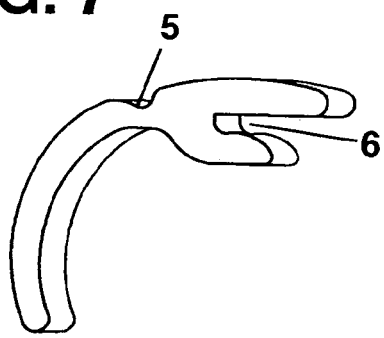

FIG. 7 represents an airfoil ring that has all the characteristics of the preferred embodiment, but lacks the locking groove 8, FIG. 5B. The natural reaction of a CD or DVD is to tend to slip upward and out of the gripping mouth 6. The embodiment shown in FIG. 7, lacking the locking groove, needs to be constructed with a higher durometer plastic, such as a durometer of 65 or above. This will make it harder with less elasticity and a CD or DVD will stay in place, making it fairly safe to toss. However, less force will be absorbed upon impact.

Figure 8:
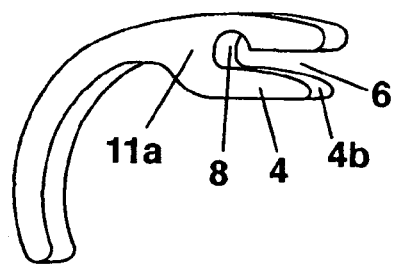

FIG. 8 represents an airfoil ring that has a similar structure to the preferred embodiment, but designed without the hinge groove 5, visible in FIG. 7. If the material used to manufacture this embodiment is soft enough, as with a material which has a durometer below about 55, the material itself absorbs and distributes impact. A softer, lower durometer material is more flexible than that used in the preferred embodiment, and even with the locking groove 8, a CD or DVD may pop out. This problem has been solved by extending the bottom lip 4 inwardly 1 to 2.5 mm, making the total length of the bottom lip 4, from the crotch 11a to its inner edge 4b, of about 4.5–7 mm. The extension of the bottom lip 4 is not necessary for flight, but will make the airfoil ring with inserted CD or DVD significantly safer upon impact.

Figure 9:
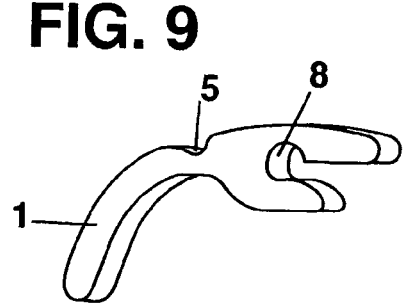

FIG. 9 represents an embodiment similar to the preferred embodiment, but differing in that the airfoil skirt 1 is shorter. Its length can range from about 10 mm vertically to about 17 mm vertically. The shape of its curve can also vary. This shortened airfoil skirt 1 will help the airfoil ring with inserted CD or DVD cut through the air better than the preferred embodiment when tossed, making it fly faster. Because the airfoil skirt 1 is shorter, it does not stabilize well in the air and may display a wobbly motion in flight.

Figure 10:
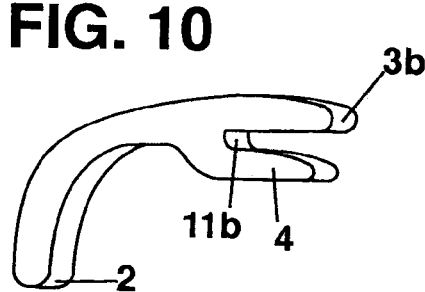

FIG. 10 represents an embodiment with a smooth curve from the inner edge of the top lip 3b to the rounded bottom edge 2 of the airfoil skirt 1. This embodiment is built for speed. Its shortened airfoil skirt 1 traps less air and its smooth upper profile creates minimal resistance. This streamlined design, however, causes it to be less safe. It has no hinge groove 5 to collapse and absorb impact force, a problem which can be solved by the use of a lower durometer material as discussed in the FIG. 8 description. It also lacks a locking groove 8 to secure the CD or DVD 7 in place. For that reason the bottom lip 4 has been extended to a distance of about 4.5–7 mm inwardly from the crotch 11b.

Figure 11:
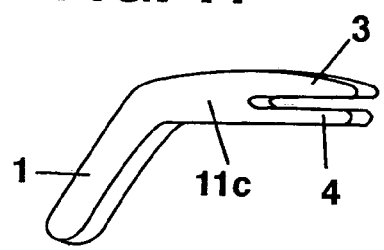

FIG. 11 represents an embodiment whose shape is less rounded than the preferred embodiment and more angular. The angles, topside and underside are situated approximately at a point where the airfoil skirt 1 meets the crotch 11c. The airfoil skirt is straight, rather than curved. This embodiment is designed for controllability in flight, meaning that because of the way it slices through the air when tossed, it will, under ideal circumstances, likely go where the user aims it. It will fly farther because it creates more lift. It lacks, however, the safety features such as the hinge groove 5 and locking groove 8. Its wider crotch area 11c and slightly elongated top lip 3 and bottom lip 4 will help hold a CD or DVD in place.

Figure 12:
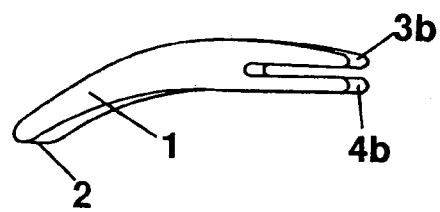

FIG. 12 represents an embodiment designed much like that of FIG. 10, but the curve of the airfoil skirt 1 is much wider. This embodiment traps less air and creates less lift, and will fly faster.

Figure 13:
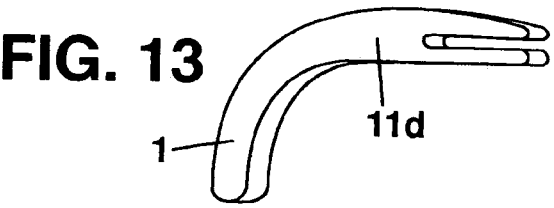

The illustration in FIG. 13 represents an embodiment with a wider crotch 11d, making the entire airfoil ring wider by 4 mm or more. The angle of the curve of the airfoil skirt 1, approximately 90 degrees, is similar to FIG. 10 in being tighter than most previously described embodiments. This design will produce more controllability, and will hover more readily, but speed of flight is sacrificed with this design.

FIGS. 14, 15, 16, 17, 18 and 19 show embodiments that differ not only in shape, but also in materials used and method of manufacture. Variations in materials, molding or sculpting processes and desired flight characteristics tend to partially dictate the shape of the embodiment. Nearly unlimited shapes and sizes are possible, based on the above-mentioned variables. These embodiments consist of a top portion 12, FIG. 14 constructed of a harder plastic or other material and a bottom portion 13 constructed of a softer plastic or other material such as soft rubber or any of a variety of soft foam products. The harder or higher durometer material in the top portion 12 holds a CD or DVD securely in place, and helps maintain the shape of the entire airfoil ring. The softer material used in the bottom portion 13 of the airfoil ring absorbs and distributes shock or impact force. The two materials are fused together, glued together or molded together, depending on the properties of the materials being used and the manufacturing process being employed. These alternative embodiments have similar dimensions to the preferred embodiment, but each differs slightly with variant modifications.

Figure 14:
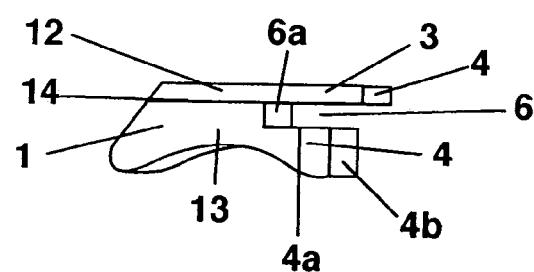
Figure 15:
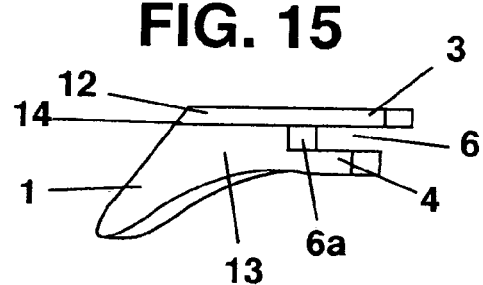
Figure 16:
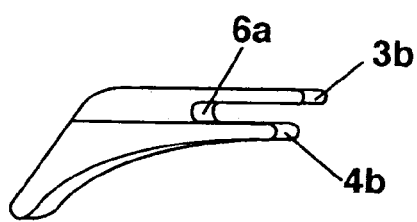

FIGS. 14, 15 and 16 show the top portion 12 consisting of only the top lip 3, from its inner edge 3b to its outer periphery, which is also the outer perimeter of the top portion 12 itself. In all three embodiments, the bottom lip 4 and gripping mouth 6 are the result of the shape of bottom portion 13 and the way in which the bottom portion 13 is connected to the top portion 12. In FIGS. 14, 15 and 16 the fused area 14 extends approximately halfway across the underside of the top portion 12 starting at its outermost edge and extending inwardly toward its inner edge, forming the top lip 3. At that inside point, at the inside edge of the fused area 14, the bottom portion has a vertical drop which forms a perpendicular wall approximately 1.5 mm measured vertically from the underside of the top portion 12. This perpendicular wall forms the back wall of the gripping mouth 6a. The bottom lip 4, an integral part of the bottom portion 13, extends inwardly and perpendicularly from the back wall of the gripping mouth 6a approximately 5–10 mm, its inner edge 4b being annularly parallel and concentric to the inner edge of the top lip 3a.

In FIG. 14 the underside of the bottom portion 13 is curved in a concave manner and is about 2–6 mm thick at the center of the curve, measured vertically from the bottom center of the curve to the fused area 14, and about 4–10 mm thick along the outer side of the bottom portion 13, from the bottom of the outer peripheral edge of the bottom portion 13 to the fused area 14. The innermost periphery of the bottom portion 13 creates the bottom lip 4, which extends about 2–6 mm from the inner edge of the bottom portion 13 upward, perpendicular to the top lip 3. The inner surface 4a of the bottom lip extends perpendicularly from the inner edge of the bottom lip 4b to the back wall of the gripping mouth 6a. The outermost edge of the bottom portion 13 and outermost edge of the top portion 12, fused together 14, form a smooth surface, about 8–15 mm long in its entirety, which preferably is angled at approximately 55 degrees (exterior angle from horizontal axis across top portion 12). The curve on the underside of this embodiment will not allow the unit to trap significant air. It is also heavier than the preferred embodiment. For these two reasons, it can be thrown harder and will fly fast and far, but will tend to wobble or lose horizontal stability in flight.

The embodiment in FIG. 15 follows the same description as FIG. 14 except for the curve of the underside of the bottom portion 13. This curve is also concave, but it extends farther downward so that the entire length of the outside edge of the top portion 12 and bottom portion 13 together is about 15–25 mm. The top lip 4 also becomes narrower.

FIG. 16 follows the same description as FIG. 15. The difference in FIG. 16 is that the entire unit has rounded edges rather than sharp edges. FIGS. 15 and 16 have wider curves on the underside. These embodiments trap air slightly, which produces a small degree of hoverability and controllability, but are better designed for flight at higher speeds because they produce less airfoil lift and less drag.

Figure 17:
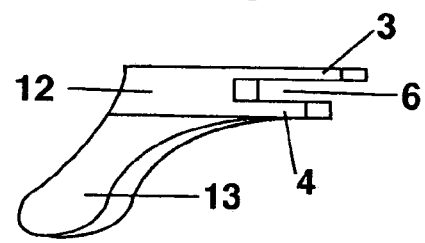
Figure 18:
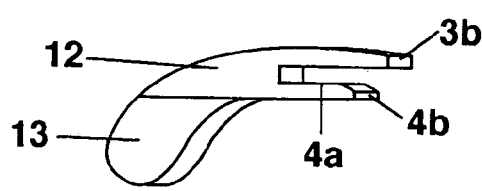
Figure 19:

In FIGS. 17, 18 and 19, the top lip 3, bottom lip 4 and gripping mouth 6 are molded as one piece. That one piece, the top portion 12, would preferably be constructed of higher durometer plastic, 60 or higher, or other harder material to securely grip a CD or DVD. The remaining bottom portion 13 would be constructed of a softer material, foam plastic, or plastic with a durometer less than 55 in order to absorb impact force.

The variance in the embodiment in FIG. 17 is that the underside of the airfoil ring slopes concavely and sharply downward from the fused area 14 under the bottom lip 4, curves outwardly at the bottom, and then again on the outer edge of the bottom portion 13, curves concavely to the fused area 14, where the outer edge of the top portion 12 continues that same curve to its top surface.

FIG. 18 follows the same description as FIG. 16 except that its outer periphery curves differently. From the bottom, the outer edge of the bottom portion 13 curves upwardly in a convex fashion, and continues the same curve all the way to the inner edge of the top lip 3b. The bottom portion is curved and thicker than the FIG. 16 embodiment. The inner edge of the bottom lip 4b is beveled toward the inner side of the bottom lip inner surface 4a for easy insertion of a CD or DVD.

FIGS. 17 and 18 have tighter curves on the underside to trap more air and create more controllability and hoverability. The sharp outer peripheral edge of the top portion 12 of the embodiment in FIG. 17 creates more resistance (drag) as it cuts through the air. It can be thrown with more control than that in FIG. 18, whose curved outer edge creates less resistance, enabling it to fly farther.

FIG. 19 shows an embodiment constructed similarly to FIGS. 17 and 18, but the curve on its underside has been removed. The bottom portion 13 is attached to the top portion 12 at an angle that can vary from 90 degrees to 150 degrees. The smaller the angle, down to about 90 degrees, stronger the airfoil characteristic, and in general the more controllability and hoverability it will display when tossed.

Although the gripping groove or mouth, formed between the upper and lower annular lips, is the preferred means for retaining the disc on the annular protective ring, other means can be employed within the scope of the invention. Examples are metal clips secured to the flexible ring and adapted to grip the disc, adhesion of the disc to the ring, or integral fingers on the annular ring that must be deformed to insert the disc and that continue to maintain gripping force.

Although the descriptions above and in previous sections contain many specifications, these should not be construed as limiting the scope of the invention but as merely providing illustrations of some of the preferred embodiments and uses of the invention. For example, the airfoil ring can have many other shapes or sizes, any of the mentioned or unmentioned shapes or embodiments can vary or be modified for specific or desired performance. Thus, the scope of the invention should be determined by the appended claims and their legal equivalents, rather than by the examples given.

We claim:

1. An annular protective rim attachment for CDs and DVDs, for providing airfoil characteristics and rendering the discs tossable and catchable while maintaining maximum safety and controllability, comprising:

an annular rim, larger in diameter than a disc to which it can be attached, means on the annular rim for gripping the outer periphery of a disc for attachment thereto, and an outer portion of the annular rim being soft and flexible in order to lessen injury or damage from impact of the assembled disc and protective rim attachment, and the outer portion of the annular rim comprising a downwardly depending skirt extending from an upper, inner annular portion downwardly and outwardly in an outwardly convex curve providing, at least in part, said airfoil characteristics, the annular rim including, generally at a top portion of said skirt, an annular hinge groove in a position to permit the skirt to be deformed inwardly via bending at the hinge upon impact of the rim attachment when combined with a disc.

2. The annular protective rim attachment of claim 1, wherein the means for gripping a disc comprises a pair of spaced apart lips at an inner side of the annular rim and forming a groove or mouth between them, the groove facing inwardly, the annular rim being integrally molded of a soft and flexible material, and the annular hinge groove being positioned just outwardly from the lips.

3. An annular protective rim attachment for CDs and DVDs, for providing airfoil characteristics and rendering the discs tossable and catchable while maintaining maximum safety and controllability, comprising:

an annular rim, larger in diameter than a disc to which it can be attached, means on the annular rim for gripping the outer periphery of a disc for attachment thereto, the means for gripping comprising a pair of spaced apart lips including an upper lip and a lower lip forming a groove or mouth between them, the groove facing inwardly so as to receive the outer edge of a disc, and the groove or mouth including an annular locking groove comprising an enlarged area at a deepest portion of said groove or mouth, and comprising an extra thickness in the upper lip immediately adjacent to the enlarged area, and at least an outer portion of the annular rim being soft and flexible in order to lessen injury or damage from impact of the assembled disc and protective rim attachment.

4. An annular protective rim attachment for CDs and DVDs, for providing airfoil characteristics and rendering the discs tossable and catchable while maintaining maximum safety and controllability, comprising:

an annular rim, larger in diameter than a disc to which it can be attached, means on the annular rim for gripping the outer periphery of a disc for attachment thereto, the means for gripping comprising a pair of lips, an upper lip and a lower lip, forming a groove or mouth between them, the groove facing inwardly so as to receive the outer edge of a disc, and the lower lip including, in its inner peripheral edge, at least one insertion notch, thereby to help facilitate attachment of a disc between said lips, and at least an outer portion of the annular rim being soft and flexible in order to lessen injury or damage from impact of the assembled disc and protective rim attachment.

* * * * *